Aug. 16, 1927.

E. MOEGELIN 1,639,049

ONE-WAY PLOW

Filed Dec. 24, 1926

Witnesses:

Inventor:
Erich Moegelin

Patented Aug. 16, 1927.

1,639,049

UNITED STATES PATENT OFFICE.

ERICH MOEGELIN, OF MOESEN, GERMANY.

ONE-WAY PLOW.

Application filed December 24, 1926, Serial No. 156,944, and in Germany October 9, 1926.

Figure 1:
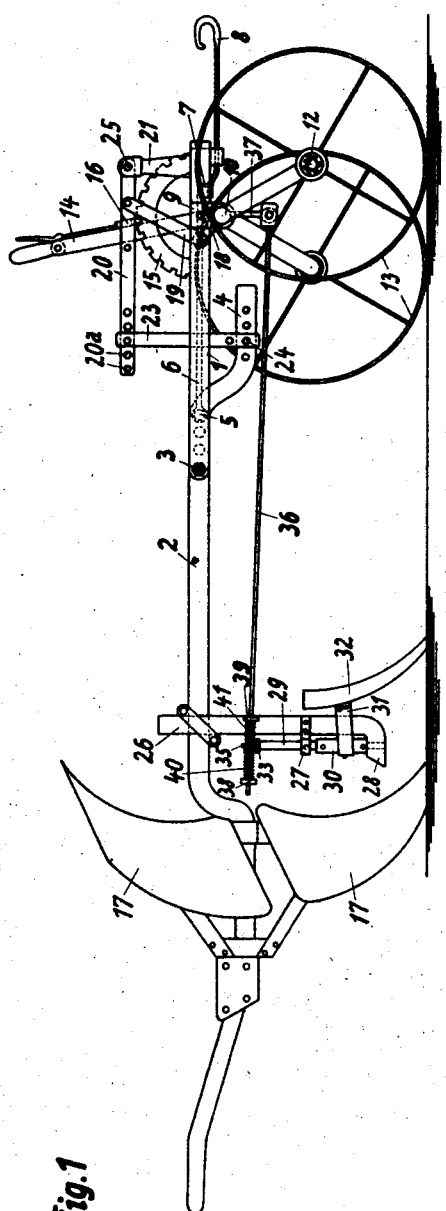
Figure 2:
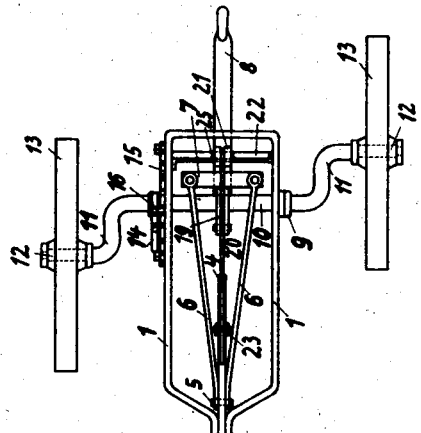
Figure 4:
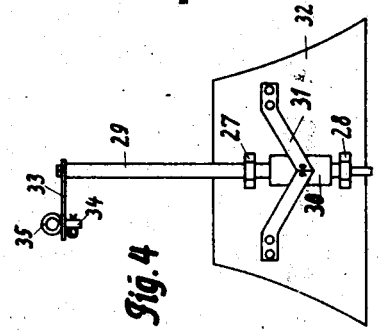
Figure 3:
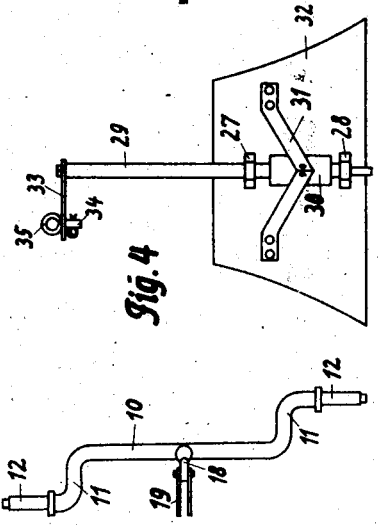

This invention relates to improvements in a one-way plow, and more particularly to improved constructional details thereof hereinafter explained and illustrated on the accompanying drawing, in which: Fig. 1 is a side view of the improved plow, Fig. 2 is a fragmentary plan view thereof. Fig. 3 is a plan view of a detail thereof, and Fig. 4 is a rear view of another detail thereof.

The plow comprises a frame 1 of which the lateral members are connected at their oblique rear ends, with the plow beam 2 between them, by means of a common pivot 3, the front end 4 of said beam forming a downwardly directed double bend and having two draw-bars 6 connected thereto by means of a bolt 5. Said draw-bars carry at their front ends a cross-member 7 to which the rod 8 with hooked end for the draught-animals is attached. The lateral members of the plow frame 1 carry depending lugs 9, in which the wheel 10 is turnably mounted. The latter carries at both ends double bends or cranks 11 (Fig. 3), which are disposed at an angle to one another (Fig. 1), the trunnions 12 of said cranks carrying the wheels 13 which are loosely mounted thereon. The axle 10 carries further a fixed adjusting-lever 14, by means of which it can be turned or adjusted in its lugs 9, said lever being locked by means of a pawl 16 with a toothed segment 15 in a way known in the art, whereby the axle 10 can be locked in any adjusted position. If the axle 10 is so adjusted that the two cranks lie symmetrically at both sides of a perpendicular line (Fig. 1), the two wheels 13 are located at equal height as with any ordinary vehicle. If, however, during the use of the plow, one wheel must run in a furrow and thus extend deeper than the other wheel, this is attained by a corresponding adjustment of the axle 10 by means of the lever 14, whereby one wheel is lowered as the other is raised.

The rear end of the plow beam 2 carries the double plow share 17 in such a way that the latter can be turned over, this being known in the art.

The axle 10 carries a fixed crank arm 18 (Fig. 3) to which one end of a link 19 is pivoted, the other end of said link being connected with a bar 20. One end of said bar is fulcrumed at 25 in a fork 21 fixed to a cross-member 22 of the frame 1, while the other free end of said bar 20 has a series of holes 20ª therein, to any one of which one end of a link 23 can be pivoted, the other end of said link being pivoted to any one of a corresponding series of holes 24 in the bent end 4 of the plow beam 2.

An adjustment of the axle 10 by means of the lever 14 results thus automatically in a simultaneous adjustment of the crank arm 18, which then either lifts or lowers the link 19 and transmits this movement to the bar 20, which is turned about its fulcrum 25 and by the link 23 either lifts or lowers the free end 4 of the plow beam 2, which turns about its pivot 3, whereby the plow share 17 is adjusted to a deeper or higher position.

In front of the plow share 17, a depending bracket 26 is fixed to the plow beam 2 in such a way that it can be adjusted in its position of height thereon. Said bracket carries two arms 27 and 28, in which a rod 29 is turnably mounted. Said rod carries, intermediate said arms. a sleeve 30 with a fixed angular member 31 fitted with the fore-share 32. The upper end of the rod 29 carries a fixed arm 33 with a hole therein in which a cotter-locked bolt 34 is loosely arranged. Said bolt has an upper eye 35 through which one end of a connection-rod 36 is passed, the other end of said rod being linked to another crank arm 37 fixed on the axle 10. The free end of said rod 36 is on both sides of the eye 35 encircled by buffer springs 40, 41 intervening between said eye and fixed or adjustable collars 38, 39 on said rod.

An adjustment of the axle 10 by means of the lever 14 results in a simultaneous adjustment of the crank arm 37, which then either advances or retracts the rod 36, whereby the arm 33 is turned with the rod 29 and the fore-share 32. Said turning can take place until the angular member 31 abuts against the bracket 26, the buffer springs 40, 41 allowing then, however, a further displacement of the rod 36 and thus a further adjustment of the axle 10 if this is required.

A turning of the axle 10 by means of the lever 14 effects a simultaneous adjustment of the road-wheels 13, of the plow share 17, and of the fore-share 32.

What I claim, is:—

1. The combination, in a one-way plow, with a frame, a plow beam at its front end pivotally connected with the rear end of the latter, a wheel axle turnably mounted in the front end of said frame, an adjusting-lever mechansm to adjust said axle to any position, two crank ends on said axle arranged at an angle to one another and having trunnions thereon, and a wheel revolubly mounted on each trunnion, said wheels being adjustable in their position of height with reference to another by an adjustment of the position of said axle; of a turn-over plow-share at the rear end of said plow beam, a crank arm fixed to said axle, a fork fixed to said frame, a bar fulcrumed to said fork, a link pivotally connecting said crank arm with said bar, and another link pivotally connecting the free end of said bar with the front end of said plow beam, said plow share being adjusted to a deeper or higher position simultaneously with the adjustment of said wheels.

In testimony whereof I have hereunto set my hand.

ERICH MOEGELIN.